United States Patent [19]
Dufrenne

[11] Patent Number: 5,225,647
[45] Date of Patent: Jul. 6, 1993

[54] MOTORIZED WELD HEAD

[75] Inventor: Gerald Dufrenne, LaVerne, Calif.

[73] Assignee: Unitek Equipment Inc., Monrovia, Calif.

[21] Appl. No.: 787,010

[22] Filed: Nov. 4, 1991

[51] Int. Cl.[5] ............................................. B23K 11/24
[52] U.S. Cl. ................................. 219/86.51; 219/109; 219/117.1
[58] Field of Search ..................... 219/109, 110, 117.1, 219/86.51

[56] References Cited

U.S. PATENT DOCUMENTS

| | | | |
|---|---|---|---|
| 3,316,383 | 4/1967 | Hill | 219/86 |
| 3,553,420 | 1/1971 | Shearer, Jr. et al. | 219/110 |
| 3,585,347 | 6/1971 | Needham et al. | 219/110 |
| 3,727,822 | 4/1973 | Umbaugh | 219/110 |
| 4,192,986 | 3/1980 | Udagawa et al. | 219/137 |
| 4,400,610 | 8/1983 | Murakami et al. | 219/124.02 |
| 4,419,558 | 12/1983 | Stiebel | 219/109 |
| 4,538,047 | 8/1985 | Nakano et al. | 219/125.1 |
| 4,540,869 | 9/1985 | Yasuoka | 219/124.34 |
| 4,590,577 | 5/1986 | Nio et al. | 364/513 |
| 4,597,519 | 7/1986 | Kurtz et al. | 228/102 |
| 4,605,833 | 8/1986 | Lindberg | 219/56.22 |
| 4,629,860 | 12/1986 | Lindbom | 219/125.1 |
| 4,670,641 | 6/1987 | Porsander et al. | 219/125.1 |
| 4,789,095 | 12/1988 | Kobayashi | 228/102 |
| 4,817,848 | 4/1989 | Gabaldon | 228/102 |
| 4,824,005 | 4/1989 | Smith, Jr. | 228/1.1 |
| 4,952,773 | 8/1990 | Orsos et al. | 219/124.34 |

Primary Examiner—Clifford C. Shaw
Attorney, Agent, or Firm—Christie, Parker & Hale

[57] ABSTRACT

The motorized weld head employs a control system which allows user control of critical welding parameters such as speed, force, position, and duration. The control system includes a position servo loop attached to a motor-driven output shaft on which a welding electrode is mounted via a spring. During a weld cycle, the control system moves the welding electrode toward a workpiece at a rapid user-defined rate. Just prior to when the electrode contacts the workpiece, the speed of the electrode is reduced to prevent damage to the parts. When contact is made, a pressure transducer measures the force exerted by the electrode on the workpiece. A comparator continuously monitors the force measured by the transducer and changes state when the measured force equals a user-defined optimum welding force. A signal is then passed to the servo loop commanding it to hold the position of the electrode effectively maintaining the applied force on the workpiece. When mechanical vibrations diminish, a user-defined weld current is enabled to the electrode. After the weld current is fired, the constant force is maintained until the weld cools. Finally, the welding electrode is automatically raised by the control system, releasing all pressure on the workpiece.

22 Claims, 4 Drawing Sheets

MOTORIZED WELD HEAD

FIELD OF THE INVENTION

The present invention relates to a device for resistance welding and more particularly to a motorized weld head having servo control for sensing and controlling the speed, direction, force and duration of the weld or bonding head.

BACKGROUND OF THE INVENTION

In resistance welding, heat and pressure are used to fuse metals together. Heat generated by the resistance of the workpieces to the flow of electricity, either melts the material at the interface or at least reduces its strength to a level where the surfaces become plastic. When the flow of current stops, the electrode force is maintained, for a fraction of a second, while the weld rapidly cools and solidifies.

Broadly speaking, there are several parameters which can be controlled in the resistance welding process, these being the electrode force on the workpiece, the magnitude of the weld current, and the duration of the weld current. These parameters have different optimum values for different materials being welded. If these parameters are not held constant, the welds obtained can vary in quality.

Maintaining weld quality in integrated circuit packages and micro circuit components and assemblies is particularly important. Precision welding equipment is used for the welding of these extremely small items. The weld heads for most precision welding equipment are either manually or pneumatically driven. Because of the limitations in control of both of these types of systems, a number of desirable control features are either very difficult or impossible to obtain.

With air-operated or manual-operated heads, there is no way to program in different speeds, forces or positions. Also, there is no satisfactory way to prevent the force from continuing to increase after the weld has been completed, which can cause damage to the weld or the entire component.

Not only is there a problem with not being able to control the force with manually or pneumatically driven weld heads, additionally, there is no means for automatically controlling the speed and the duration of contact of the weld or bonding head. Therefore, there exists a need for the automatic control of speed, force, duration and pressure of the weld head in a precision welding device for the welding of a broad range of precision applications such as integrated circuit packages and micro circuit components.

SUMMARY OF THE INVENTION

A principal object of this invention is to provide an apparatus and method for precisely controlling welding parameters essential for optimum welding. An equally important objective of the present invention is that it is readily controlled by computer generated signals for use with automated equipment.

In order to achieve this objective, the apparatus and method controls the speed, position, and the rate of force of contact of the welding electrodes with the workpiece. Furthermore, the invention provides a method for maintaining a constant user-defined force for a predetermined duration of time, before, during, and after a weld current is enabled to the electrode.

These highly desirable features are incorporated into a mechanical weld head driven by a control system containing a position servo loop. The loop, controlled by user defined input voltages, comprises an input resistor, a feedback resistor, a servo amplifier, a DC motor, and a position transducer. The DC motor is attached to the welding electrode through a linear output shaft which can be driven toward and away from a workpiece. The linear motion of the output shaft is tightly coupled to the position transducer allowing for precise position measurements. Moreover, speed can be controlled because the rate the shaft moves is directly proportional to the rate of change of the input voltage to the loop. Therefore, the output shaft, and hence the welding electrode, can be positioned anywhere in its operating span at any speed within the capability of the motor.

The speed and position control features allow for fast, precise welding. Once the command is given to begin a weld cycle, the welding electrode can be driven rapidly to a search position thousandths of an inch above the maximum height of the workpiece. Then the speed of the output shaft can be significantly reduced as the electrode contacts the workpiece to prevent damage to especially fragile workpieces.

The force control feature of this invention is provided by a spring assembly and apparatus for force measurement and comparison. A spring attached between the output shaft and the welding electrode allows the electrode to be driven along with the shaft. As the shaft and electrode are driven toward a workpiece, the electrode will first contact the rigid workpiece and stop. However, the shaft will continue to move, compressing the spring and causing mechanical force to be exerted on the workpiece. The rate of force applied by the electrode on the workpiece is determined by the rate the output shaft moves toward the workpiece. A pressure transducer, such as a load cell, attached between the shaft and the spring accurately measures this force.

In order to maintain a desired force for uniform welding of several similar workpieces, a force comparator continually monitors the voltage signal derived from the load cell and compares it to the force voltage defined by the user controls. When the force exerted on the workpiece by the electrode equals that selected by the user, the comparator changes state, triggering both a hold interval and a firing delay. During the hold interval, the input voltage to the servo loop is held constant, maintaining the position of the output shaft as well as the force applied by the electrode on the workpiece. During the firing delay, weld current to the welding electrode is disabled. This feature is desirable to allow any mechanical vibration of the weld head to diminish before the actual weld energy is applied.

When the firing delay expires, the user-defined weld current is delivered to the electrode. After the current has stopped, the hold interval continues to maintain the welding force as the weld cools. Finally, the electrode is raised on cue from the control system. A precise, repeatable weld has been performed.

As can be readily inferred from this summary, the features of this invention allow for the precise control of critical welding parameters not found in the prior art. These features are essential for optimum welding of workpieces, including but not limited to, small, fragile integrated circuit chips.

BRIEF DESCRIPTION OF THE DRAWINGS

The invention will now be described in more detail with reference to the accompanying drawings in which.

DETAILED DESCRIPTION OF THE INVENTION

Figure 1:
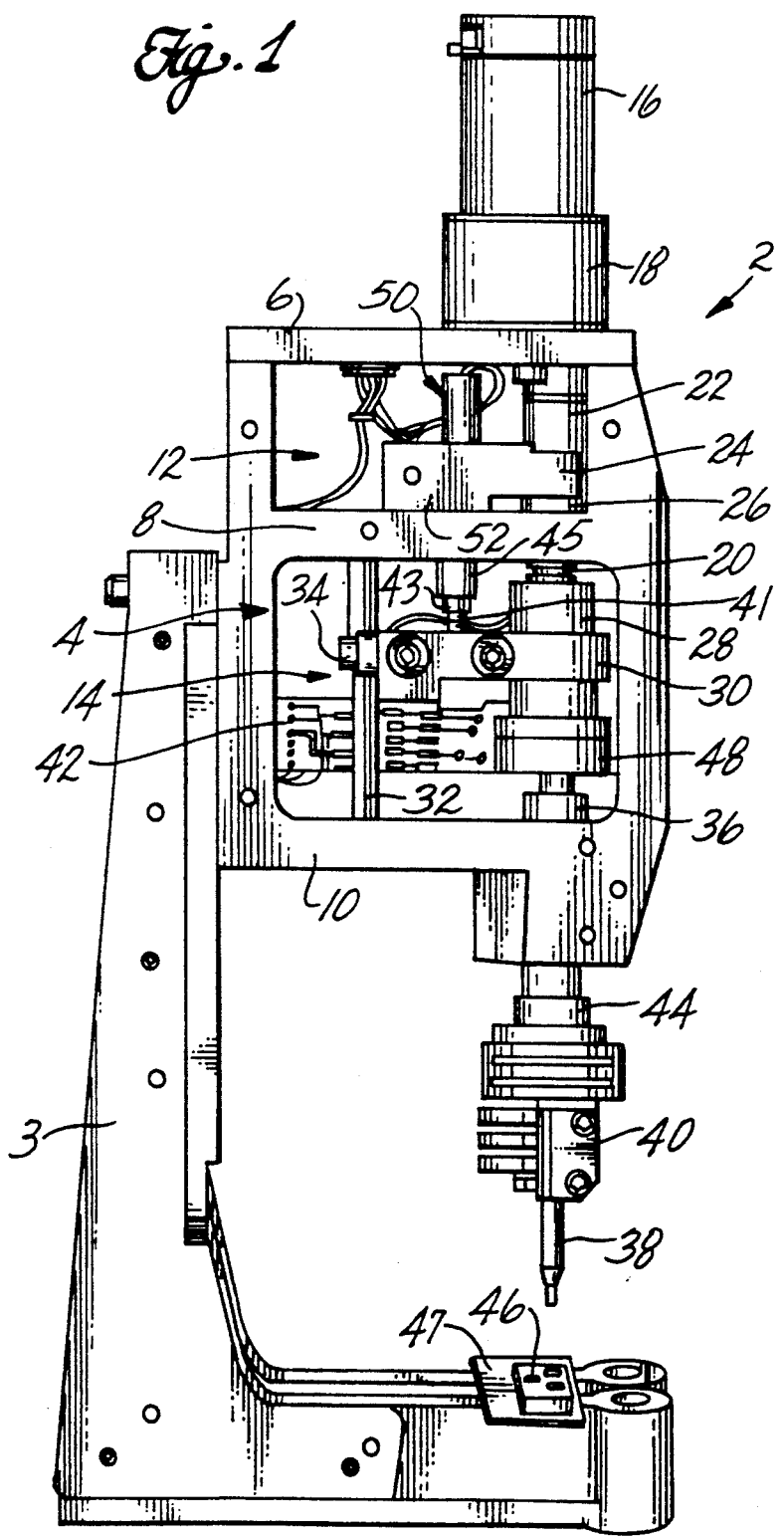
FIG. 1 is a side elevation showing the motorized weld head apparatus according to the present invention.

A motorized weld head apparatus according to the present invention incorporates control apparatus which enable a user to control critical parameters of a weld cycle via servo controlled motion. In FIG. 1, a presently preferred embodiment of the subject weld head apparatus provides a welding electrode to be moved upwardly and downwardly to precise locations along the z-axis of the electrode at a variable speed. As a result of position and speed control, both the rate of force and the amount of force the electrode exerts on a workpiece can be varied and controlled as required for optimum welding.

Figure 4:
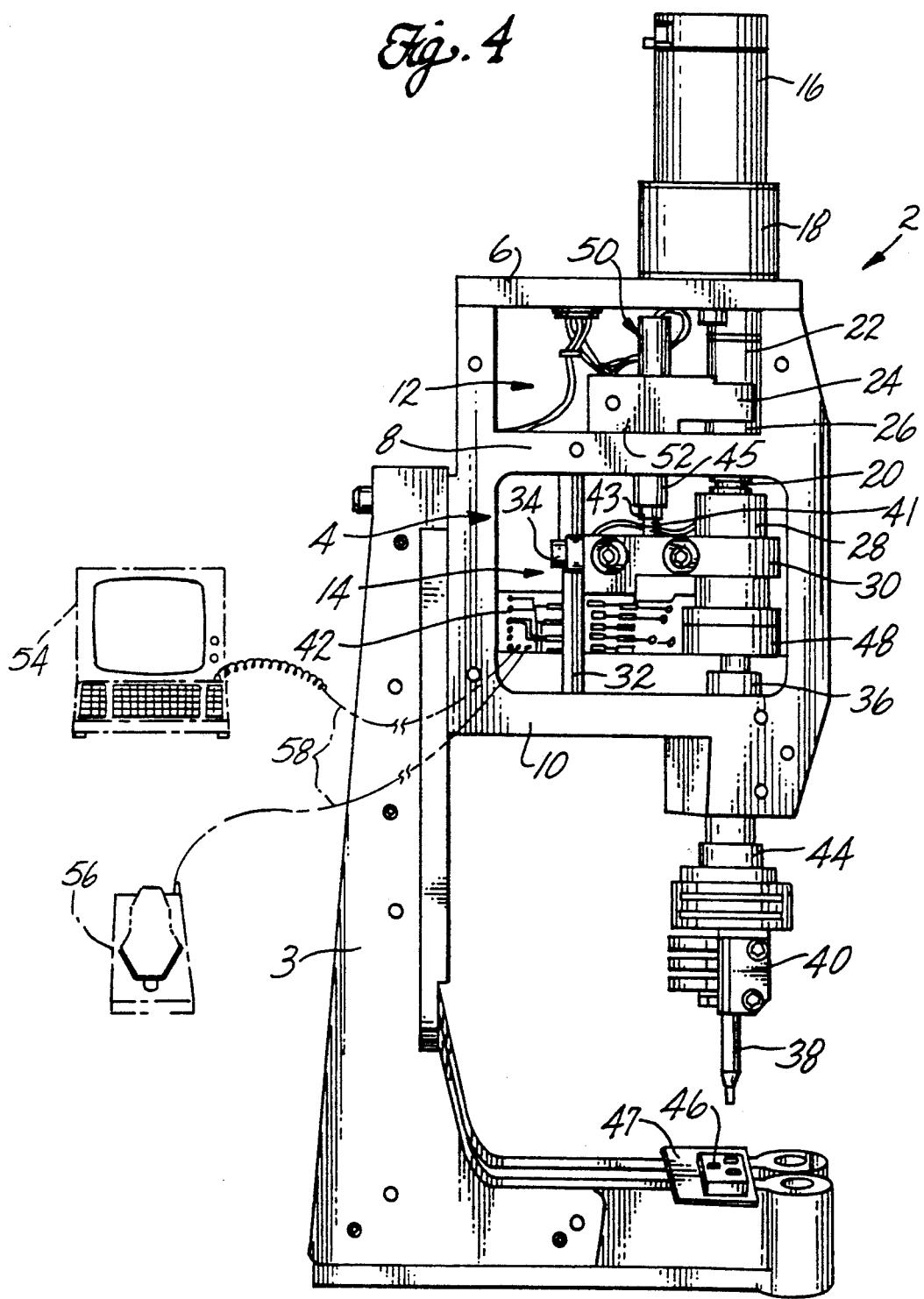
FIG. 4 is a side elevation showing the motorized weld head apparatus along with user controls for the weld head.

The various components of the motorized weld head 2 will first be described. Referring to FIG. 1, a support for the weld head comprises a two-legged base 3 to which housing 4 is fixedly mounted. Housing support members including an upper member 6, a middle member 8 and a lower member 10 each extend horizontally across the length of the housing. The three support members together define an upper cavity 12 and a lower cavity 14. Housing 4 supports a drive motor 16 which moves a welding apparatus. The welding apparatus, to be discussed subsequently, includes a welding electrode 38 and an electrode holder 40. Weld apparatus controls including a keyboard 54 and a foot pedal 56 shown in FIG. 4, are connected to circuit board 42 through cables 58. The circuit board containing the amplifier for the control system, fixedly attaches to supports in the lower cavity of the housing. The remaining elements of the control system, to be discussed subsequently, are housed external to the weld head in, for example, the keyboard controls 54 (FIG. 4) or an external power supply (not shown). Transducer apparatus 48,50, for measuring both the applied force exerted on a workpiece 46 by the welding electrode and the position of the electrode relative to the workpiece, is also mounted on housing 4.

The drive for the welding apparatus comprises a bidirectional DC servo motor 16, a gearcase 18, a motor driven lead screw 20 threaded into a lead nut 28, and an output shaft 36. Motor 16 and gearcase 18 are fixedly mounted on top of upper support member 6. To enable the motor to rotate the lead screw, the upper end of lead screw 20 is attached to the gearcase through an internally threaded universal coupling 22. Both the universal coupling and the lead screw are supported by a thrust bearing 26 fixedly mounted on the upper surface of the middle support member 8 by clamp 52. The thrust bearing protrudes through the middle support member and prevents linear motion of the lead screw as it threads into lead nut 28 within the lower cavity.

To facilitate the conversion from the angular motion of the lead screw 20 to the linear motion of the lead nut 28 along the screw, one end of an antirotation clamp 30 fixedly attaches to the lead nut to prevent angular motion of the nut. The other end of the antirotation clamp is movably mounted to an antirotation shaft 32 by means of bearings 34. The antirotation shaft 32, fixedly mounted to both the middle support member 8 and the lower support member 10, vertically traverses the lower cavity in parallel alignment to the z-axis of the driving apparatus. As the lead nut is displaced by the angular motion of the lead screw driven by the motor, the antirotation clamp slides vertically along the length of the antirotation shaft in conjunction with the displacement of the nut. Thus, angular displacement of lead nut is prevented while linear displacement is allowed.

Located beneath the lead nut and antirotation clamp, output shaft 36 protrudes through the lower support member 10 and provides a mechanical connection between the drive portion and the welding portion of the weld head apparatus. As the lead nut is displaced, shaft bearings (not shown) within the lower support member 10 allow linear motion of the output shaft. The welding portion, comprising an electrode 38 secured by an electrode holder 40, is attached to the output shaft through a compressible spring assembly 44. As the motor 16 drives the welding apparatus downward on cue from the control system the electrode contacts a rigid workpiece 46 on work table 47. The workpiece exerts an upward z-axis force on the spring assembly 44 resulting in its compression. The rigid output shaft, however, continues its downward motion, further compressing the spring assembly 44 along the downward z-axis. The net effect of the combined force from the drive motor and the workpiece is a linear force on the spring assembly proportional to the torque provided by the motor.

To measure the force exerted on the workpiece by the welding apparatus, a load cell 48 or other pressure transducer is mounted between the output shaft and the spring assembly. The load cell accurately measures the force exerted on the workpiece by the welding electrode 38 and generates a voltage output signal proportional to the force which is amplified on the printed circuit board 42 and transmitted to the control system. To measure the linear displacement of the welding apparatus along the z-axis, a position transducer 50 contains a cylindrical shaft 43 that moves linearly within a slightly wider cylindrical transducer body 45 mounted to the middle support member 8 via the transducer clamp 52. A compression spring 41, coaxially mounted around the transducer shaft, keeps the shaft extended to its outward stop. The spring compresses as the antirotation clamp 30 moves upward, keeping the end of the position transducer shaft against the antirotation clamp.

Although one form of motorized weld machinery has been described, it is contemplated that other types of motorized weld heads may be used in conjunction with the servo control system.

A control system for operating the mechanical motorized weld head apparatus which allows the user direct control of critical welding parameters will now be described.

Figure 2:
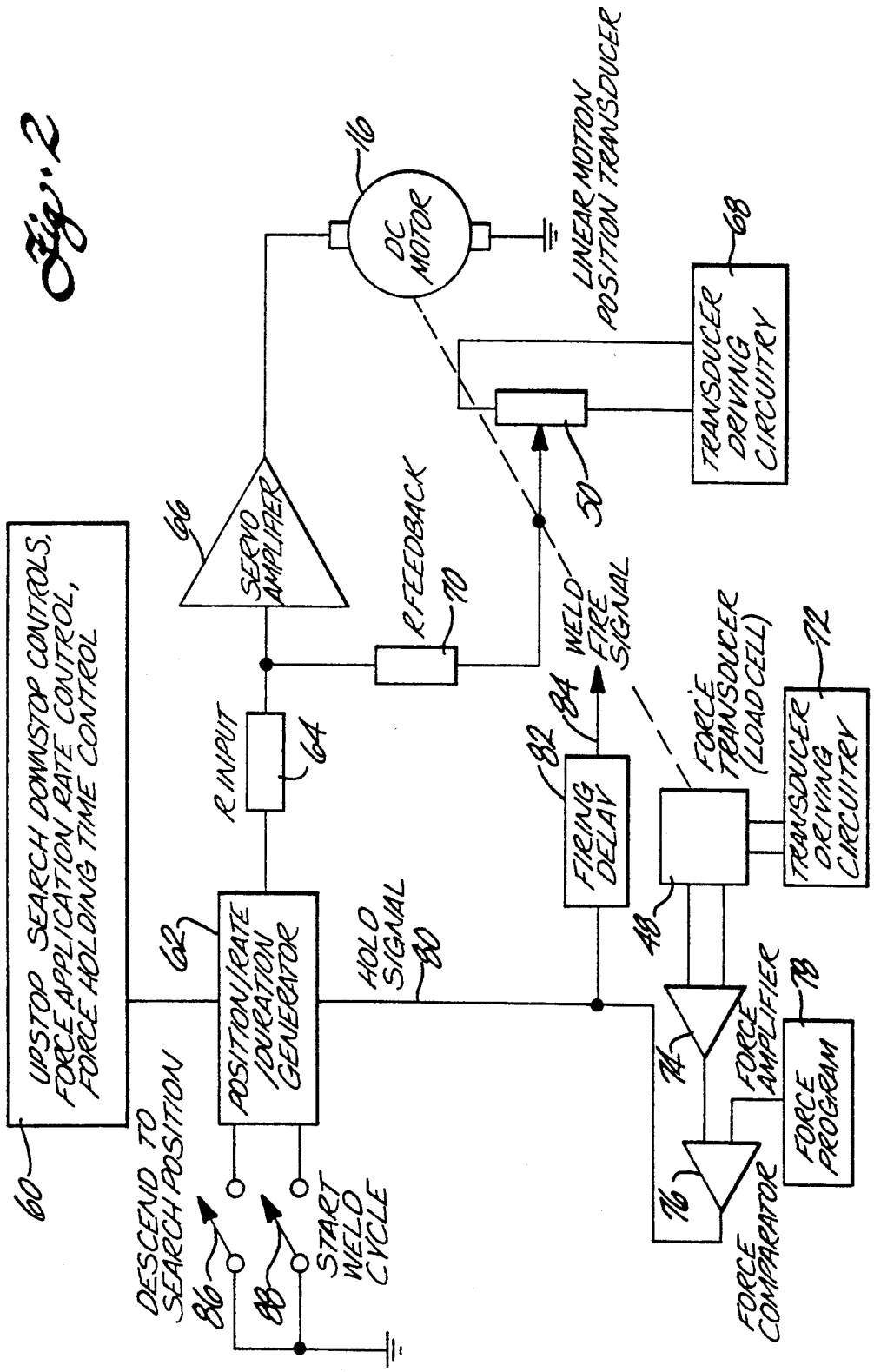
FIG. 2 is a block diagram of the control system for the weld head apparatus of FIG. 1.

A block diagram for explaining the control system is shown in FIG. 2. The user control means 60 allows the user to command the operation of the weld head either directly, with control apparatus such as a keyboard with a display 54 and a foot pedal 56 (FIG. 4) or automatically, with a computer program. Regardless of the means used, the speed, force, duration, and position of the welding apparatus may effectively be controlled. The user controls drive generator 62 to produce a voltage waveform whose shape and amplitude is dependant on the control desired. For example, as the generator receives a command from the user control to increase the speed of the welding apparatus between desired positions, the generator will produce a proportionally increased voltage ramp signal. This voltage ramp produced by the generator is one component of the input voltage to the servo loop circuit.

The servo loop circuit, an essential feature of this control system, comprises input resistor 64, servo amplifier 66, bidirectional DC servo motor 16, linear motion position transducer 50, and feedback resistor 70. As the input voltage enters the servo loop, it first encounters servo amplifier 66 which augments the voltage signal in order to sufficiently power the motor. The voltage delivered to the servo motor is proportional to the voltage input from the generator 62. The more voltage delivered to the motor, the faster it will run. By means of the angular to linear motion conversion apparatus the motor can drive the welding apparatus upwardly and downwardly along the z-axis. The position transducer, independently powered by transducer driving circuitry 68, precisely measures the displacement of the welding apparatus and outputs a voltage signal proportional to the said displacement directly into the feedback loop comprising the feedback resistor. The feedback voltage signal provides a second component of input voltage to the servo amplifier in addition to that produced by the generator. The effect of the feedback loop is that a instantaneous preferred steady state position of the welding apparatus will be maintained by the servo loop. If the position transducer senses that the welding apparatus is displaced from its instantaneous steady state position, the fundamental operation of the servo loop will drive the apparatus back toward the correct position.

As the welding apparatus is driven downwardly by the motor, it may engage a rigid workpiece 46. A force transducer, comprising the load cell 48, is independently powered by transducer driving circuitry 72. The load cell senses the force exerted on the workpiece and more particularly, on the spring assembly 44, by the welding apparatus and outputs a voltage signal proportional to the amount of force exerted on the workpiece into a force amplifier 74. The resulting augmented voltage signal from the force amplifier provides one of two inputs into a force comparator 76. The second input is provided by a force program 78. The function of the comparator is to continuously compare the two inputs and change state when the inputs are equal.

The force program, as well as the entire means for sensing force in combination with the servo loop, is an important feature of the control system. The force program is a preprogrammed or user controlled means of producing a voltage level which represents the optimum force to be applied by the welding apparatus on to the workpiece. The force program can be programmed either for simple constant force welding applications or, if necessary, for more complex variable force applications.

When the force sensed by the load cell and thus its output voltage equals the output voltage of the force program, the comparator will change state triggering two separate but simultaneous voltage signals. The first signal triggered is a hold signal 80 to the generator 62 which commands the generator to maintain the present input voltage to the servo loop. The function of the hold signal is to maintain the force specified by the force program between the welding apparatus and the workpiece. The hold signal can be manipulated either by the user or by a computer program to maintain the duration of the force as desired. The second signal triggered by the comparator is a firing delay 82 which temporarily blocks current flow to the welding electrode via a switch (not shown) within the weld current control circuit. The purpose of the firing delay is to allow mechanical vibrations of the welding apparatus to significantly diminish prior to enablement of a weld current to the electrode. The firing delay further allows the user to visually check the alignment of the welding apparatus with respect to the workpiece, vary the force exerted on the workpiece by the welding electrode, or compute an appropriate welding current. As with the hold signal, the length of the firing delay can be freely altered by the user or a computer program.

The end of the firing delay triggers a weld fire signal 84 which enables the welding current to flow through the weld current control circuit to the electrode for actual welding. This signal, also programmable or user-controlled, may be long or short depending on the requirements of the weld to the workpiece. The end of the weld fire signal which cuts off user control to the generator 62 by means of switches 86,88. Finally, under direct control of the servo loop, the welding apparatus rises away from the welded workpiece marking the end of a weld cycle.

Figure 3:
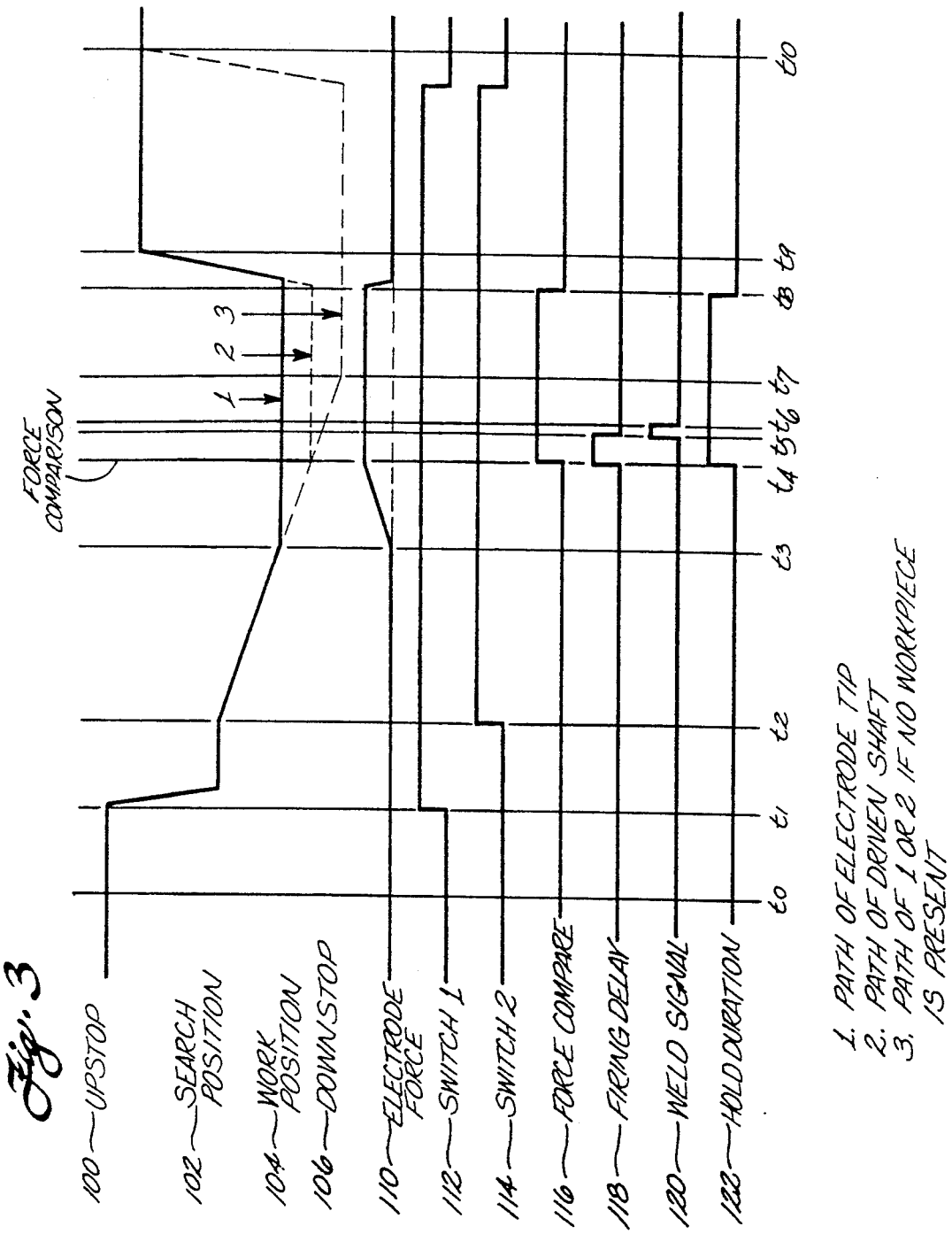
FIG. 3 is a timing diagram for the weld head apparatus showing the actions and timing intervals of the various operations of the apparatus during a typical weld cycle.

In order to further describe the essential features of the motorized weld head, an example of a typical weld cycle will now be described by reference to the timing diagram of FIG. 3.

During a typical weld cycle, at initial time t0, the user will place the workpiece 46 to be welded directly underneath the upper electrode 38. At this time the welding apparatus will be positioned at an upstop position 100, a predetermined position representing the minimum displacement of the driving shaft along the z-axis relative to the DC motor. At time t1, by depressing a weld cycle start switch 88 such as a foot pedal to change the state of the switch 112, the user, via the control system, will drive the welding electrode 38 downwardly from the upstop position to a search position 102 slightly (e.g., three thousandths of an inch) above the maximum height of the workpiece 46.

At time t2, by depressing a search position descent switch 86 such as a second level of the foot pedal, the switch will change state 114. The welding electrode will proceed downwardly (indicated by path 1) from the search position toward the workpiece. At time t3, assuming the workpiece is aligned axially with respect to the electrode 38, the electrode will engage the workpiece. Due to the rigidity of the workpiece, the electrode will cease to move further downward. However, the driven output shaft 36 will continue to proceed downwardly (indicated by path 2) both compressing the spring assembly between the shaft and the electrode and increasing the force exerted on the workpiece by the electrode. Also at t3, when the load cell 48 senses the electrode force 110 via the compression of the spring assembly 44, the load cell will output a voltage signal into the force comparator 76.

At time t4, the electrode force 110 sensed by the load cell equals that of the force program 78. The comparator changes state 116 triggering both the hold delay 22 and the firing delay 118. The hold delay maintains the constant force specified in the force program between the electrode and the workpiece. At time t5, after any mechanical vibration of the electrode has adequately diminished, the firing delay 118 switches off. Simultaneously the weld signal 120 switches on, enabling current flow to the electrode tip. At time t6, the weld signal ends and the current is stopped. However, the hold signal continues to maintain a constant applied force to the workpiece as the molten metal cools. At time t8 the hold signal ends, the force comparison ceases, and the electrode rises releasing the force applied to the workpiece. At time t9, the welding apparatus automatically returns to the upstop position under direct control of the servo loop. Finally, by time t10, all switches have returned to their initial positions, marking the end of the weld cycle.

If no workpiece is encountered by the electrode, the output shaft and the electrode will travel to a predetermined downstop position 106 at time t7 (indicated by path 3). This downstop position represents the maximum displacement of the driving shaft relative to the motor along the downward z-axis. Since no force is built up to initiate the completion of the cycle, the electrode will remain at the downstop position until the weld cycle switch 88 changes state 114 ending the weld cycle. Thus, the control system provides means to precisely control welding parameters.

The described embodiment of the invention is only considered to be preferred and illustrative of the inventive concept; the scope of the invention is not to be restricted to such embodiment. Various and numerous other arrangements may be devised by one skilled in the art. For example, all of the user controls could take the form of a computer program, capable of producing numerous and complex welding operations automatically. Furthermore, a lower electrode may be employed on the apparatus for welding various sides of a workpiece simultaneously.

What is claimed is:

1. A method of contacting an object by an electrode with user-controlled parameters comprising:
    (a) providing a movable electrode;
    (b) generating a speed control signal defining a rate of motion of the electrode;
    (c) generating a force control signal defining a force to be placed on the object by the electrode;
    (d) generating a position control signal defining a displacement of the electrode relative to the object;
    (e) generating a duration control signal defining a length of time the electrode contacts the object;
    (f) integrating the speed, force, position, and duration signals in a control means;
    (g) driving the electrode toward a position proximate the surface of the object by the control means at the rate of motion defined by the speed control signal; and thereafter
    (h) further driving the electrode toward the object at a rate of motion less than the rate of motion defined by the speed control signal.

2. The method of claim 1 further comprising the steps of:
    compressively contacting the electrodes to the object to exert a resilient force thereon;
    measuring the force of contact between the electrode and the object;
    comparing the measured force to the force defined by the force control signal;
    maintaining the measured force at the force defined by the force control signal;
    enabling a weld current to the electrode for a predetermined length of time less than or equal to the length of time defined by the duration control signal; and thereafter
    releasing the force on the object after a length of time defined by the duration control signal.

3. The method of claim 2 in which the step of compressively contacting the object with the electrode comprises compressing resilient means in a mechanically derived linkage to the electrode.

4. The method of claim 1 in which the steps of generating speed, force, position, and duration control signals are generated by an automatic computer program.

5. A motorized weld head comprising:
    means for selecting a speed control signal representative of the speed of an electrode relative to an object;
    means for selecting a force control signal representative of a force to be applied by the electrode on the object;
    position monitoring means for continuously monitoring position of the electrode relative to the object;
    means coupled to the position monitoring means for moving the electrode at the speed represented by the speed control signal;
    force monitoring the means for monitoring the force applied by the electrode to the object;
    means for comparing the monitored force to the selected force; and
    means for maintaining the selected force exerted by the electrode on the object for a predetermined time.

6. The apparatus of claim 5, in which the means for monitoring the force applied by the electrode to the object comprises a force transducer.

7. The apparatus of claim 6 in which the force transducer is a load cell.

8. The apparatus of claim 5 in which the means for comparing the monitored force to the prescribed force comprises a comparator with a plurality of inputs.

9. The apparatus of claim 8 in which one input to the comparator comprises the force control signal.

10. The apparatus of claim 8 in which another input into the comparator comprises an output of the load cell.

11. A motorized weld head comprising:
    a support means;
    means for mounting a movable shaft on the support means permitting motion of the shaft relative to the support means;
    driving means for moving the shaft linearly with respect to the support means;
    speed control means for controlling a rate at which the shaft moves linearly with respect to the support means;
    spring means for resiliently attaching a welding electrode to the movable shaft;
    operator controlled means for controlling a force to be exerted by the weld head;
    means for measuring a force exerted on a workpiece by the electrode;

means for comparing the operator controlled force to the measured force: and means for maintaining the operator controlled force between the electrode and the workpiece for a predetermined duration.

12. The apparatus of claim 11, in which the driving means comprises a motor driven lead screw and nut attached to antirotation apparatus.

13. The apparatus of claim 11, in which the operator controlled means comprises apparatus which generates a signal indicative of a desired force value.

14. The apparatus of claim 11, further comprising position monitoring means operatively engaged with the shaft, for continuously monitoring the position of the shaft.

15. The apparatus of claim 11, in which the means for maintaining the operator controlled force comprises a force comparator which outputs a plurality of signals.

16. The apparatus of claim 15, in which one signal provides means to maintain a position of the driving means.

17. The apparatus of claim 15, in which another operator controlled means enables a weld current to the electrode.

18. A motorized weld head comprising the combination of control system having speed control means attached to motor means, driving means attached to the motor means, force sensing means attached to the driving means, spring means attached to the force sensing means, and welding means attached to the spring means.

19. The apparatus of claim 18 in which the driving means comprises an anti-rotation apparatus.

20. The apparatus of claim 18, in which the force sensing means comprises a load cell.

21. The apparatus of claim 18, in which the welding means comprises a welding electrode, mounting means for the welding electrode, enabling means for providing a current to the electrode, and disabling means for terminating current to the electrode.

22. The apparatus of claim 21, in which the enabling means comprises firing means to control the amount of current provided to the electrode, and holding means responsive to the disabling means, for maintaining the force of the electrode after the current to the electrode has been terminated.

* * * * *